US007009808B2

(12) United States Patent
Kovinskaya et al.

(10) Patent No.: US 7,009,808 B2
(45) Date of Patent: Mar. 7, 2006

(54) STEPPED ENCLOSURE FOR MINIMIZING AIRFLOW EXCITATION IN A DATA STORAGE DEVICE

(75) Inventors: Svetlana I Kovinskaya, Edmond, OK (US); Kenneth L Pottebaum, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 111 days.

(21) Appl. No.: 10/147,133

(22) Filed: May 15, 2002

(65) Prior Publication Data

US 2003/0117746 A1    Jun. 26, 2003

Related U.S. Application Data

(60) Provisional application No. 60/342,959, filed on Dec. 20, 2001.

(51) Int. Cl.
*G11B 33/14* (2006.01)
(52) U.S. Cl. .................................. 360/97.02
(58) Field of Classification Search .......... 360/97.01, 360/97.02; 369/75.1
See application file for complete search history.

(56) References Cited

U.S. PATENT DOCUMENTS

| 4,280,155 A | 7/1981 | Scott et al. |
| 4,780,776 A | 10/1988 | Dushkes |
| 4,857,087 A | 8/1989 | Bolton et al. |
| 5,541,791 A | 7/1996 | Yamasaki et al. |
| 5,631,787 A | 5/1997 | Huang et al. |
| 5,695,649 A | 12/1997 | Becktold |
| 6,577,577 B1 * | 6/2003 | Watanabe et al. ........... 369/75.2 |
| 2003/0081350 A1 * | 5/2003 | Wang et al. ............. 360/97.02 |

* cited by examiner

*Primary Examiner*—George Letscher
(74) *Attorney, Agent, or Firm*—Fellers, Snider, et al.

(57) ABSTRACT

A stepped enclosure for a rotating disc data storage device having an actuator operably moveable within a range of movement adjacent the rotating disc in a data reading and writing relationship. The stepped enclosure comprises an airflow conditioning surface disposed in a substantially close-fitting relationship with the disc and spatially disposed therefrom a first distance. The enclosure further comprises a niche, or recessed area, in the airflow conditioning surface apart from the actuator range of movement defined by a recessed surface disposed a second distance from the disc greater than the first distance.

28 Claims, 10 Drawing Sheets

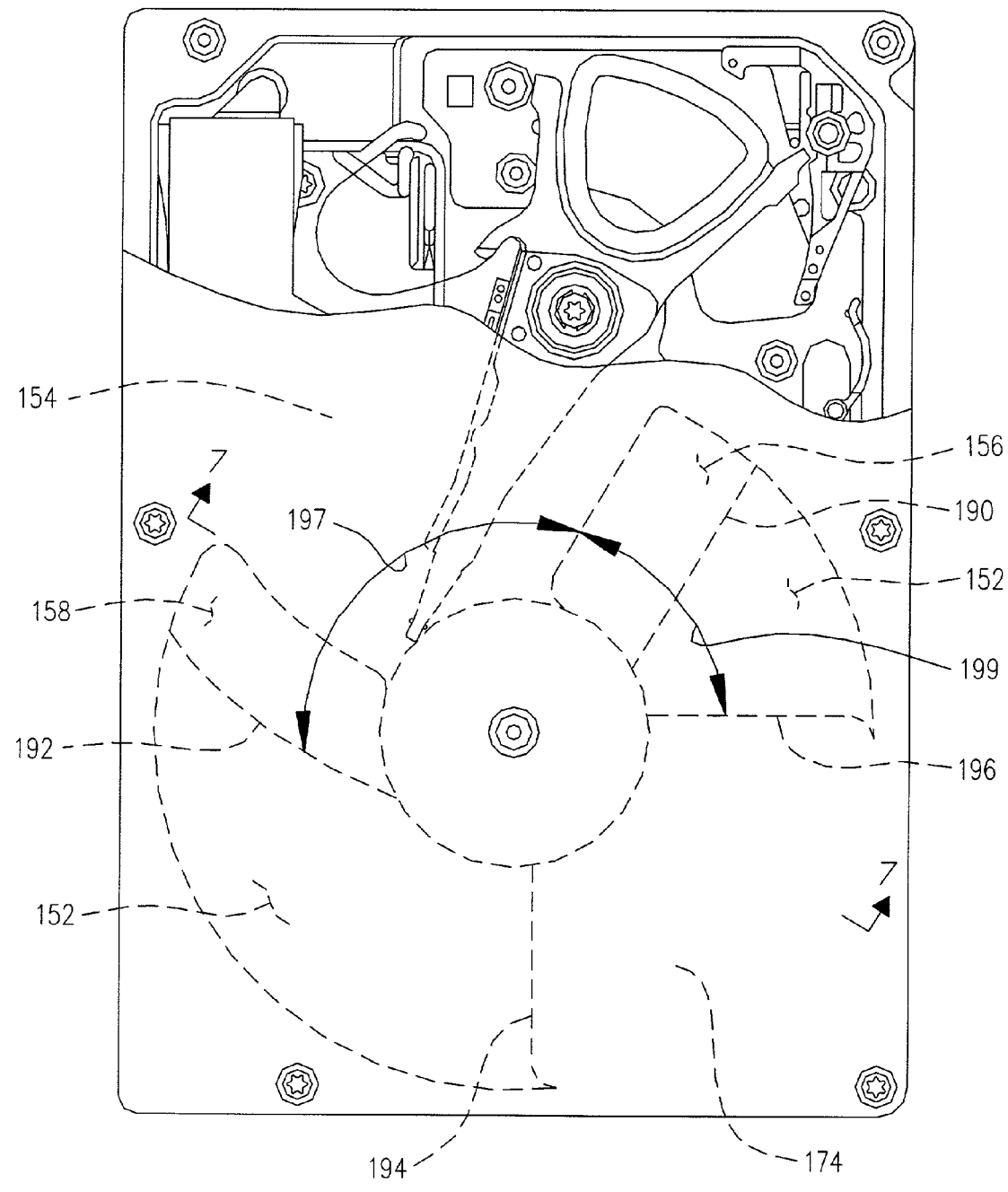
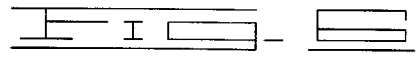

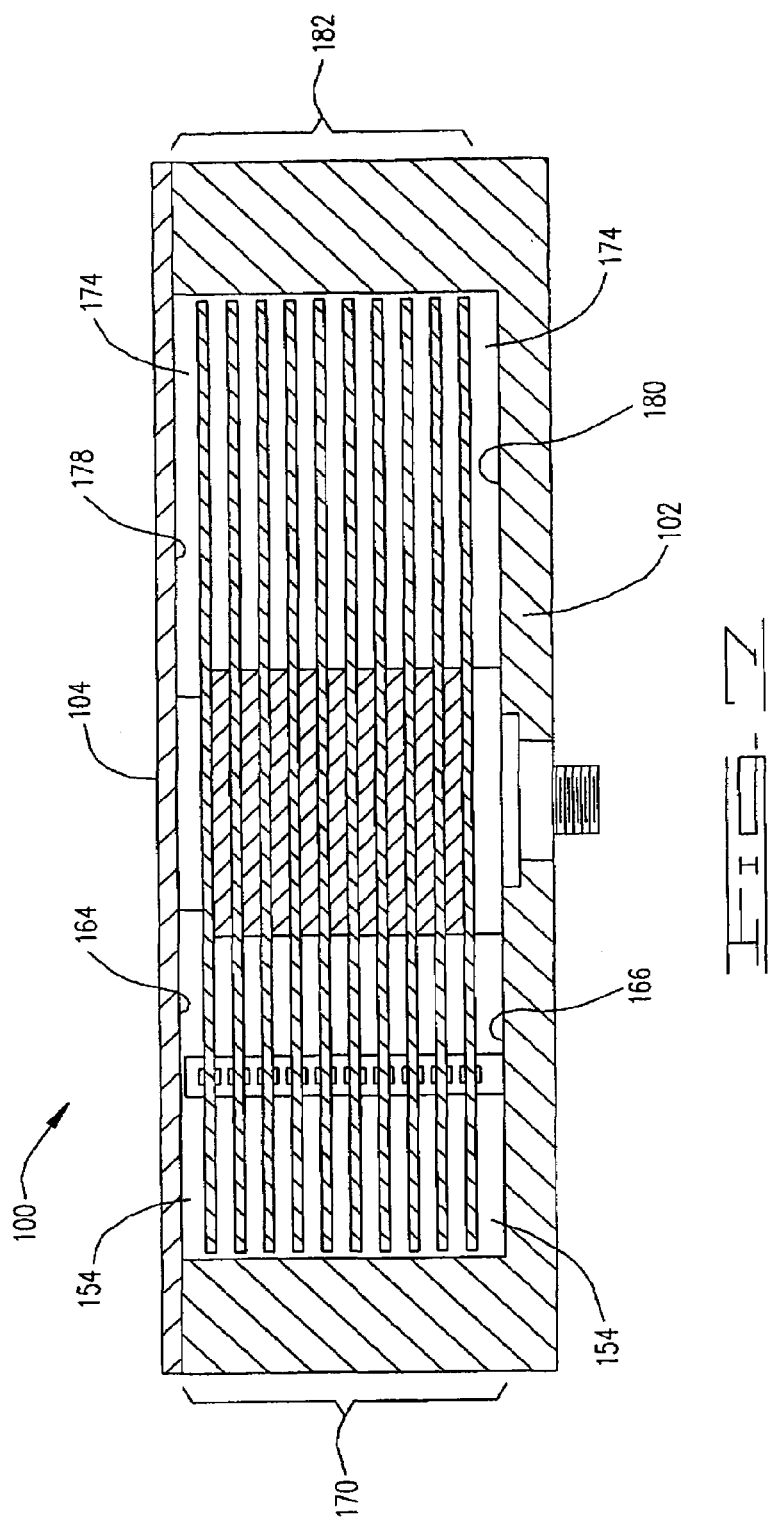

STEPPED ENCLOSURE FOR MINIMIZING AIRFLOW EXCITATION IN A DATA STORAGE DEVICE

CROSS REFERENCE TO RELATED APPLICATIONS

This application claims the benefit of U.S. Provisional Application No. 60/342,959 filed on Dec. 20, 2001.

FIELD OF THE INVENTION

This invention relates generally to the field of data storage devices, and more particularly but not by way of limitation to reducing airflow excitation forces that are generated by a spinning data storage disc.

BACKGROUND OF THE INVENTION

Modern data storage devices such as disc drives are commonly used in a multitude of computer environments to store large amounts of data in a form that is readily available to a user. Generally, a disc drive has a data storage disc, or two or more stacked data storage discs, that are rotated by a motor at high speeds. Each disc has a data storage surface divided into a series of generally concentric data tracks where data is stored, such as in the form of magnetic flux transitions.

A data transfer member, such as a magnetic transducer, is moved by an actuator to selected positions adjacent the data storage surface to sense the magnetic flux transitions in reading data from the disc, and to transmit electrical signals to induce the magnetic flux transitions in writing data to the disc. The active elements of the data transfer member are supported by suspension structures extending from the actuator. The active elements are maintained a small distance away from the data storage surface as the data transfer member flies upon an air bearing generated by airflow caused by the spinning discs.

A continuing trend in the industry is toward ever-increasing the data storage capacity and processing speed while maintaining or reducing the physical size of the disc drive. Consequently, continual efforts are being made to miniaturize the data transfer member and supporting structures, increase storage densities, increase disc speed, and decrease fly height. These efforts result in an overall increased sensitivity to vibration.

One source of vibration stems from airflow excitation that is generated by the spinning data storage discs. Airflow currents spiral outwardly in response to the disc rotation, that is, from rotational friction forces and centrifugal forces. If the airflow becomes turbulent it can impart adverse vibrations on the disc and the actuator assembly, likely resulting in actuator positioning errors and data reading and writing errors.

There have been numerous attempts to limit the adverse effects of airflow excitation on the data storage device components. For example, shrouding the peripheral edge of the spinning disc is a well-known and widely practiced solution that effectively reduces the airflow turbidity, especially at the disc edge where turbulence can produce disc flutter. Also, flow straightener members laterally adjacent the data storage surface are commonly employed to minimize the airspace adjacent the outer disc in a disc stack, thereby reducing eddy currents that form in the airflow. Such flow straightening members can be defined by extending boss portions from the enclosure so as to position an airflow conditioning surface portion of the boss in a substantially parallel and close-fitting relationship with the data storage surface.

It can be necessary to provide a clearance niche, or recessed area, in the airflow conditioning surface for movement of the actuator assembly within an operable range of movement. This interruption of the airflow-conditioning surface creates strictly periodical pressure changes and can induce turbulent conditions at and near the actuator. It has been determined that airflow excitation can be reduced by defining a stepped enclosure comprising one or more additional countering niches in the airflow conditioning surface apart from the clearance niche. The size and placement of the countering niche(s) can be selected to compensate for the periodic motion of the disc relative to the clearance niche, thereby suppressing harmonic frequencies of vibration near known resonant frequencies of the disc drive. It is to these improvements and others as exemplified by the description and appended claims that embodiments of the present invention are directed.

SUMMARY OF THE INVENTION

The embodiments of the present invention contemplate an enclosure with a stepped airflow conditioning surface for a rotating disc data storage device having an actuator operably moveable within a range of movement adjacent the rotating disc in a data reading and writing relationship. The airflow conditioning surface is disposed in a substantially close-fitting relationship with the disc, separated therefrom a first distance. A first recessed surface defines a recessed area, or clearance niche, in the airflow conditioning surface to provide clearance for the actuator movement. A second recessed surface defines a second niche, referred to as a countering niche, in the airflow conditioning surface apart from the first niche to commutatively suppress vibrations from periodic perturbations created by airflow excited by the clearance niche.

In one aspect of the embodiments of the present invention the stepped enclosure comprises a countering niche extending laterally to the disc. The enclosure comprises first stationary opposing surfaces defining the airflow conditioning surface adjacent a first portion of the rotating disc. The airflow conditioning surface defines a first gap receivingly engaging the rotating disc. The enclosure furthermore comprises second stationary opposing surfaces adjacent a second portion of the rotating disc defining a clearance gap greater than the first gap receivingly engaging the actuator throughout an operable range of movement. The enclosure furthermore comprises third stationary opposing surfaces adjacent a third portion of the rotating disc defining a countering gap greater than the first gap receivingly engaging the rotating disc, the first opposing surfaces separating the second opposing surfaces from the first opposing surfaces.

In one aspect of the embodiments of the present invention the stepped enclosure comprises a countering niche extending orthogonally to the disc. The airflow conditioning surface comprises an arcuate peripheral surface around the disc defining a substantially close-fitting shroud adjacent an edge of the disc. An opening in the shroud admits the actuator throughout the operable range of movement, and a countering niche extends along a portion of the shroud apart from the opening.

In one aspect of the embodiments of the present invention a data storage device is contemplated comprising a rotating data storage disc in an operable data reading and writing relationship with an actuator, and means for reducing airflow excitation by employing a stepped enclosure around the disc and actuator, the enclosure comprising a clearance niche for operable movement of the actuator and a countering niche apart from the clearance niche for commutatively suppressing airflow excitation forces.

These and various other features as well as advantages which characterize the present invention will be apparent upon reading of the following detailed description and review of the associated drawings.

BRIEF DESCRIPTION OF THE DRAWINGS

FIG. 6 is a plan view of the data storage device of FIG. 1 employing a countering niche extending laterally to the rotating disc.

FIG. 7 is a cross-sectional view taken generally along the section line 7—7 in FIG. 6.

DETAILED DESCRIPTION

Figure 1:
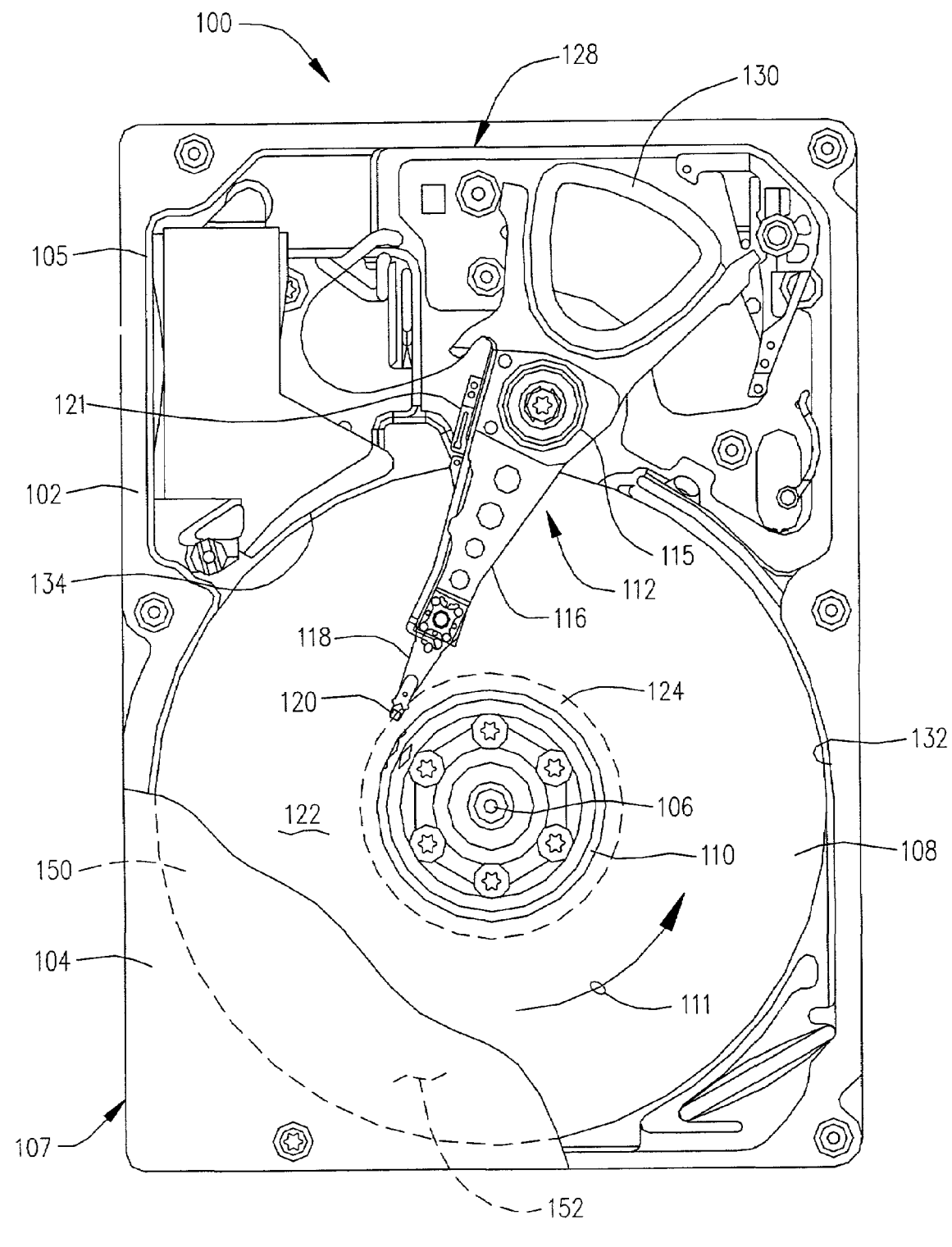
FIG. 1 is a plan view of a data storage device constructed in accordance with an embodiment of the present invention.

Referring to the drawings in general, and more particularly to FIG. 1, shown therein is a plan representation of a data storage disc drive 100 constructed in accordance with an embodiment of the present invention. The disc drive 100 includes a base 102 to which various components are mounted, and a cover 104 (partially cut-away) which together with the base 102 and a perimeter gasket 105 forms an enclosure 107 providing a sealed internal environment for the disc drive 100.

Figure 3:
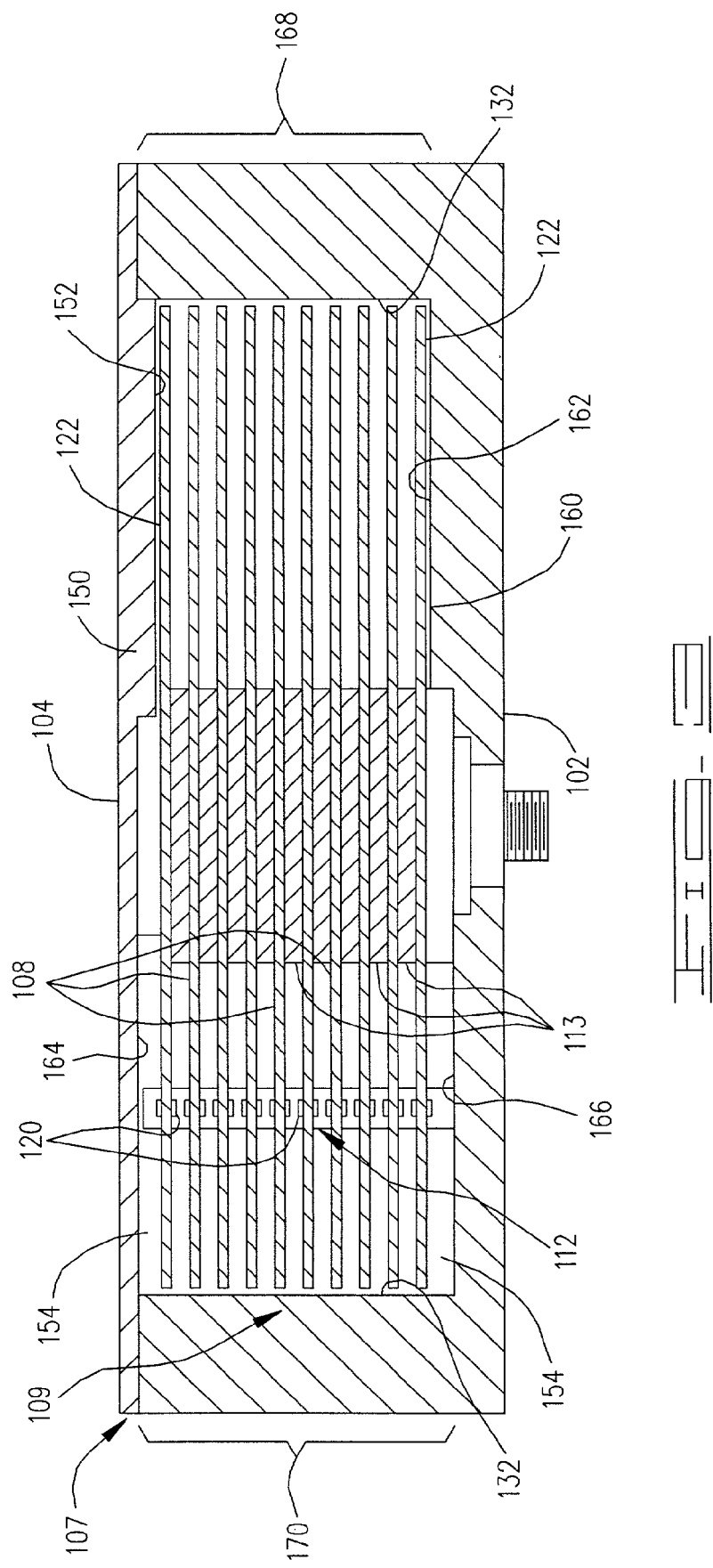
FIG. 3 is a cross-sectional view of the prior art data storage device taken generally along the section line 3—3 in FIG. 2.

Mounted to the base 102 is a motor 106 to which one or more data storage discs 108 are stacked and secured by a clamp ring 110 for rotation at a high speed in direction 111. A plurality of discs 108 can be stacked with alternating disc spacers 113 (FIG. 3) to form a disc stack 109 (FIG. 3). An actuator 112 pivots around a pivot bearing 115 in a plane parallel to the discs 108. The actuator 112 has actuator arms 116 (only one shown in FIG. 1) that support load arms 118 in travel across the discs 108 as the actuator arms 116 move within the spaces between adjacent discs 108. The load arms 118 (or "flexures") are flex members that support data transfer members, such as read/write heads 120 ("heads"), with each of the heads 120 operatively interfacing one of the discs 108 in a data reading and writing relationship. Data read and write signals are transmitted from the head 120 to a preamplifier 121 by electrical traces (not shown) extending along the actuator 112.

Each of the discs 108 has a data storage region comprising a data storage surface 122 divided into concentric circular data tracks (not shown). Each of the heads 120 are positioned adjacent a desired data track to read data from or write data to the data track. A circular landing zone 124 where the heads 120 can come to rest against the respective discs 108 at times when the discs 108 are not spinning can bound the data storage surface 122 inwardly. Alternatively, the landing zone 124 can be located elsewhere.

The actuator 112 is positioned by a voice coil motor (VCM) 128 comprising an electrical coil 130 and a magnetic circuit source. The magnetic circuit source conventionally comprises one or more magnets supported by magnetic poles to complete the magnetic circuit. When controlled current is passed through the actuator coil 130, an electromagnetic field is set up which interacts with the magnetic circuit, causing the actuator coil 130 to move. As the actuator coil 130 moves, the actuator 112 pivots around the pivot bearing 115, causing the heads 120 to travel across the discs 108 within an operable range of movement between the innermost and outermost data tracks.

The motor 106 spins the discs 108 at a high speed as the head 120 reads data from and writes data to the data storage surface 122. The kinetic energy of the spinning discs 108 transfers through the boundary layer at the disc/air interface, thereby inducing a rotational force component to an airflow, while centrifugal force imparts a radial force component to the airflow. These forces combine creating a generally outwardly spiraling airflow boundary layers. The head 120 includes an aerodynamic slider portion (not shown), which engages the airflow to fly the head 120 away from the data storage surface 122 during data reading and writing operations.

There are continual demands in the industry for data storage devices with increased storage capacity and access performance. One common way of meeting these demands is to increase the motor 106 speed so as to reduce latency in presenting the desired data storage location to the head 120. Increasing the motor 106 speed can be problematic, however, in that the corresponding increased disc 108 speed in turn increases the likelihood that turbulence occurs near the head 120 and the supporting structure.

Various solutions have been proposed to counter the airflow excitation forces associated with the faster disc 108 and actuator 112 speed. In some instances flow straightener members are defined in substantially parallel and close-fitting relationship with the disc 108 to keep the airflow laminar. For example, FIG. 1 illustrates a closely-fitting upstanding shroud 132 defined by the base 102 to create a more uniform field of airflow velocity. FIG. 1 also illustrates the use of a downstream shroud 134 that can be installed to fill the opening in the shroud 132 through which the actuator 112 is pivoted to merge with the disc stack 109 during fabrication. The shroud 132 and the downstream shroud 134 define orthogonal airflow conditioning surfaces reducing airflow turbulence.

It is also common to extend lateral airflow conditioning surfaces in the form of planar bosses extending from the base 102 and the cover 104 substantially parallel to the data storage surface 122. In FIG. 1, for example, a circular boss 150 partially cut away) extends from the cover 104, minimizing the airspace between the cover 104 and the adjacent disc 108. Although not shown in FIG. 1, a corresponding boss 160 (FIG. 3) can extend from the base 102 for the same reason. These bosses 150, 160 (FIG. 3) define airflow-conditioning surfaces 152, 162 (FIG. 3) that are parallel and in close-fitting relationship with the rotating data storage surface 122.

It is not uncommon that the required clearance between the airflow conditioning surface 152, 162 (FIG. 3) and the data storage surface 122 in order to obtain a laminar flow does not provide ample clearance for the actuator 112 to move within the operable range of movement. Thus, it can be necessary to extend the enclosure bosses 150, 160 adjacent as much of the disc 108 as possible, while leaving a niche, or a recessed area, in the enclosure bosses 150, 160 for the actuator 112 operable movement.

Figure 2:
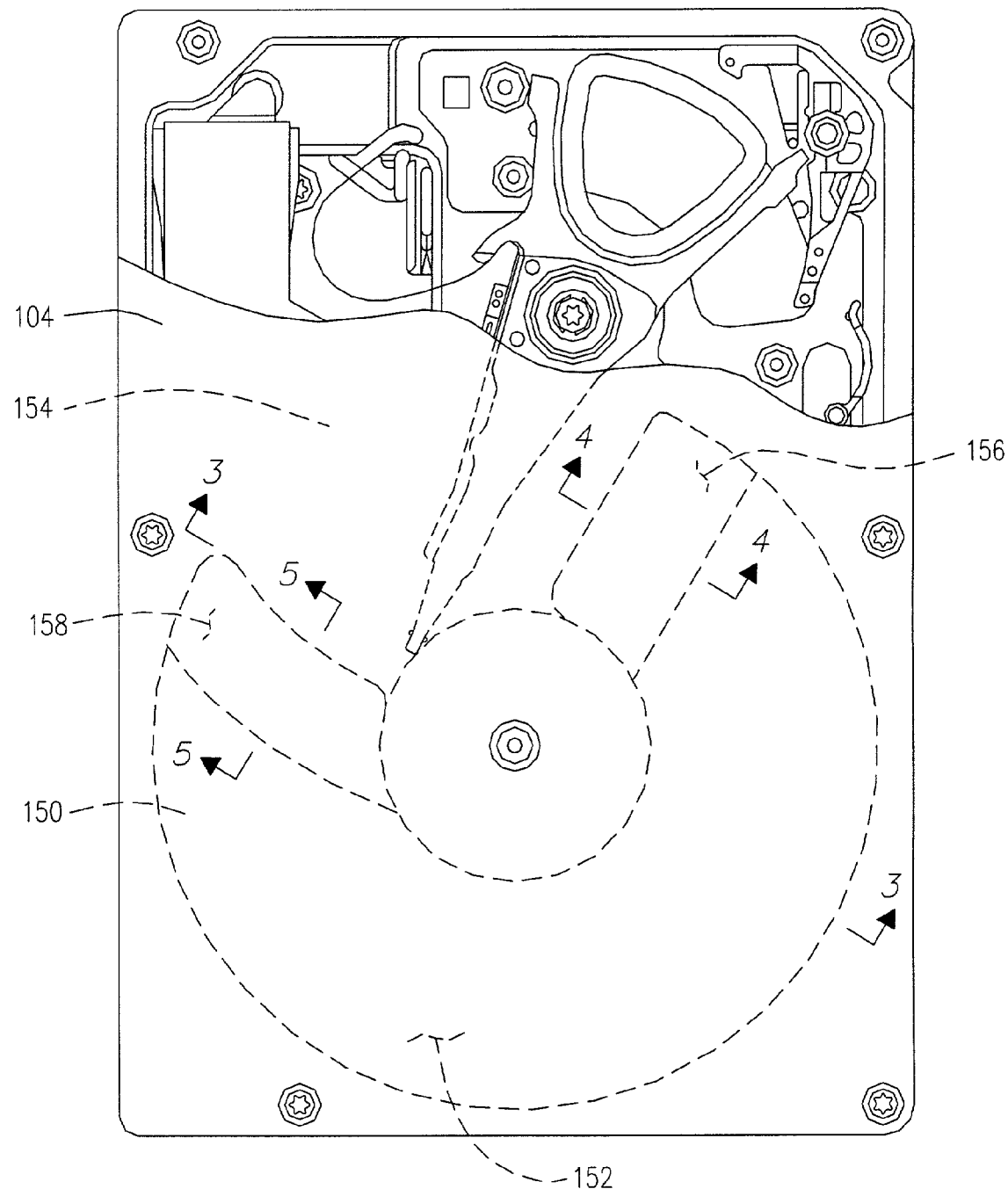
FIG. 2 is a plan view of a prior art data storage device.

FIG. 2 is similar to FIG. 1 except that the visible portion of the cover 104 extends over the entire disc 108. The boss 150 defines a niche 154 (referred to as the "clearance niche"), permitting clearance for the actuator 112 to move within the operable range of movement. Angled transition surfaces 156, 158 serve to smooth the airflow transition during expansion and compression as discussed below.

FIG. 3 is a cross-sectional view taken generally along the line 3—3 in FIG. 2. The airflow conditioning surface 152 of the cover 104 is shown in substantially parallel and close-fitting relationship with data storage surface 122 of the top disc 108. The opposing boss 160 of the base 102 terminates in the airflow-conditioning surface 162 disposed in substantially parallel and close-fitting relationship with the data storage surface 122 of the bottom disc 108. The airflow conditioning surfaces 152, 162 and the upstanding shroud 132 encompass the disc stack 109 with minimal airspace clearances in order to establish laminar airflows. FIG. 3 also shows the clearance niche 154 for movement of the actuator 112 within the operable range of movement. The clearance niche 154 is defined by a clearance surface 164 of the cover 104 and an opposing clearance surface 166 of the base 102, joined by the upstanding shroud 132.

Accordingly, the embodiments of the present invention comprise an enclosure 107 somewhat similar to the prior art construction of FIG. 3 by providing a substantially airtight internal environment for a rotating disc data storage device having an actuator 112 operably moveable within a range of movement adjacent the rotating disc 108 in a data reading and writing relationship. The enclosure 107 comprises first stationary opposing surfaces 152, 162 of the bosses 150, 160 adjacent a first portion of the rotating disc 108 defining a first gap 168 receivingly engaging the rotating discs 108 of the disc stack 109. The enclosure 107 furthermore comprises second stationary opposing surfaces 164, 166 defining a clearance gap 170 greater than the first gap 168 and receivingly engaging the rotating discs 108 of the disc stack 109.

Figure 4:
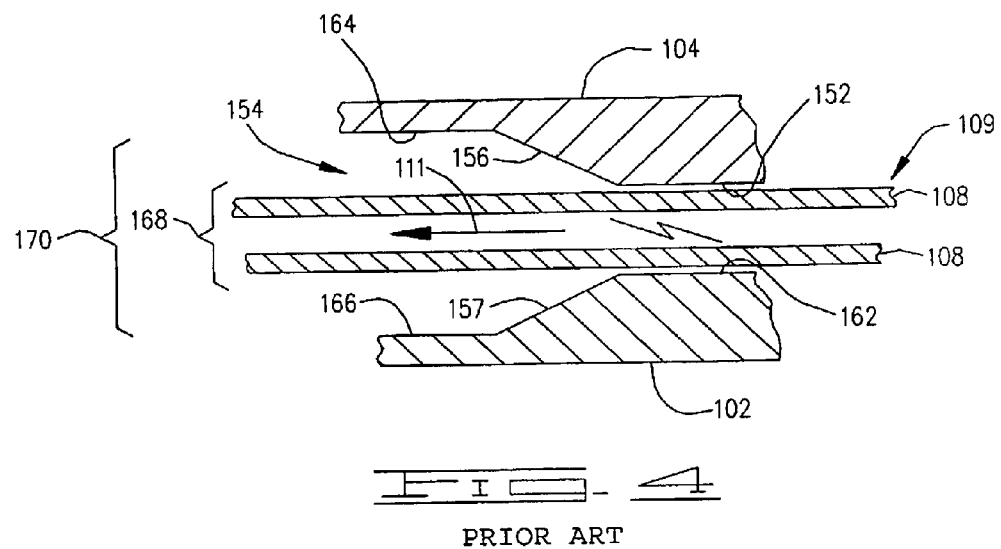
FIG. 4 is a cross-sectional view of the prior art data storage device taken generally along the section line 4—4 in FIG. 2.
Figure 5:
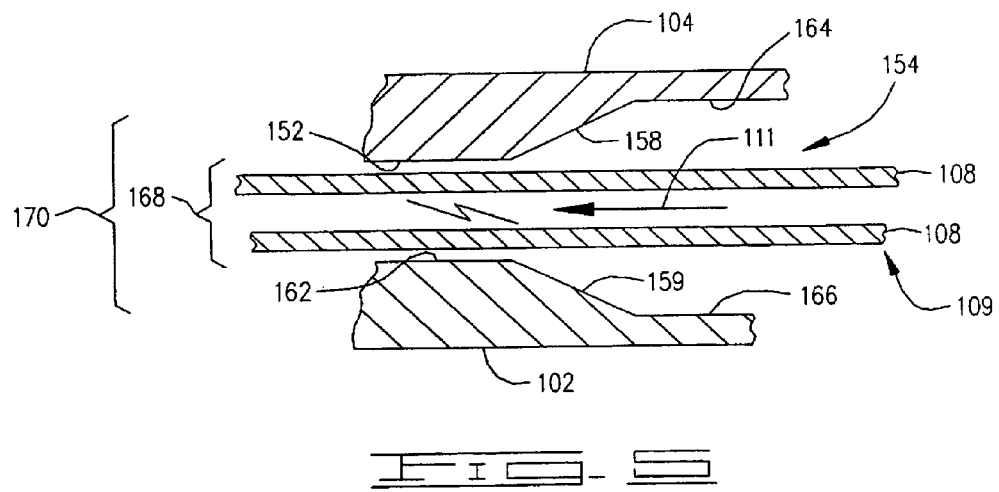
FIG. 5 is a cross-sectional view of the prior art data storage device taken generally along the section line 5—5 in FIG. 2.

FIGS. 4 and 5 are diagrammatic cross-sectional views taken along the section lines 4—4 and 5—5, respectively, in FIG. 2. As the disc stack 109 rotates in direction 111 the airflow entering the clearance niche 154 in FIG. 4 undergoes instantaneous expansion. Contrarily, airflow moving in direction 111 from the clearance niche 154 in FIG. 5 undergoes instantaneous compression. The differential velocity and pressure gradients associated with these transitions can produce airflow perturbations and turbulence resulting in unacceptable vibration induced in the discs 108 and the actuator 112.

Turning now to FIG. 6 which is a view similar to FIG. 2 but of an enclosure constructed in accordance with an embodiment of the present invention. It has been determined that by defining another niche 174 (referred to herein as a "countering niche") in the airflow conditioning surfaces 152, 162 (FIG. 4), separated from the clearance niche 154, the airflow excitation effects of the clearance niche 154 can be commutatively suppressed.

FIG. 7 is a cross-sectional view taken along the section line 7—7 in FIG. 6, illustrating the clearance niche 154 and the countering niche 174. It will be noted that countering niche 174 surfaces 178, 180 of the cover 104 and base 102, respectively, define a gap 182 that is greater than the gap 168 (FIG. 3) defined by the opposing airflow conditioning surfaces 152, 162. Note also from FIGS. 6 and 7 that the opposing airflow conditioning surfaces 152, 162 separate the clearance niche 154 from the countering niche 174, thereby forming the stepped characteristics in the enclosure 107.

Figure 8:
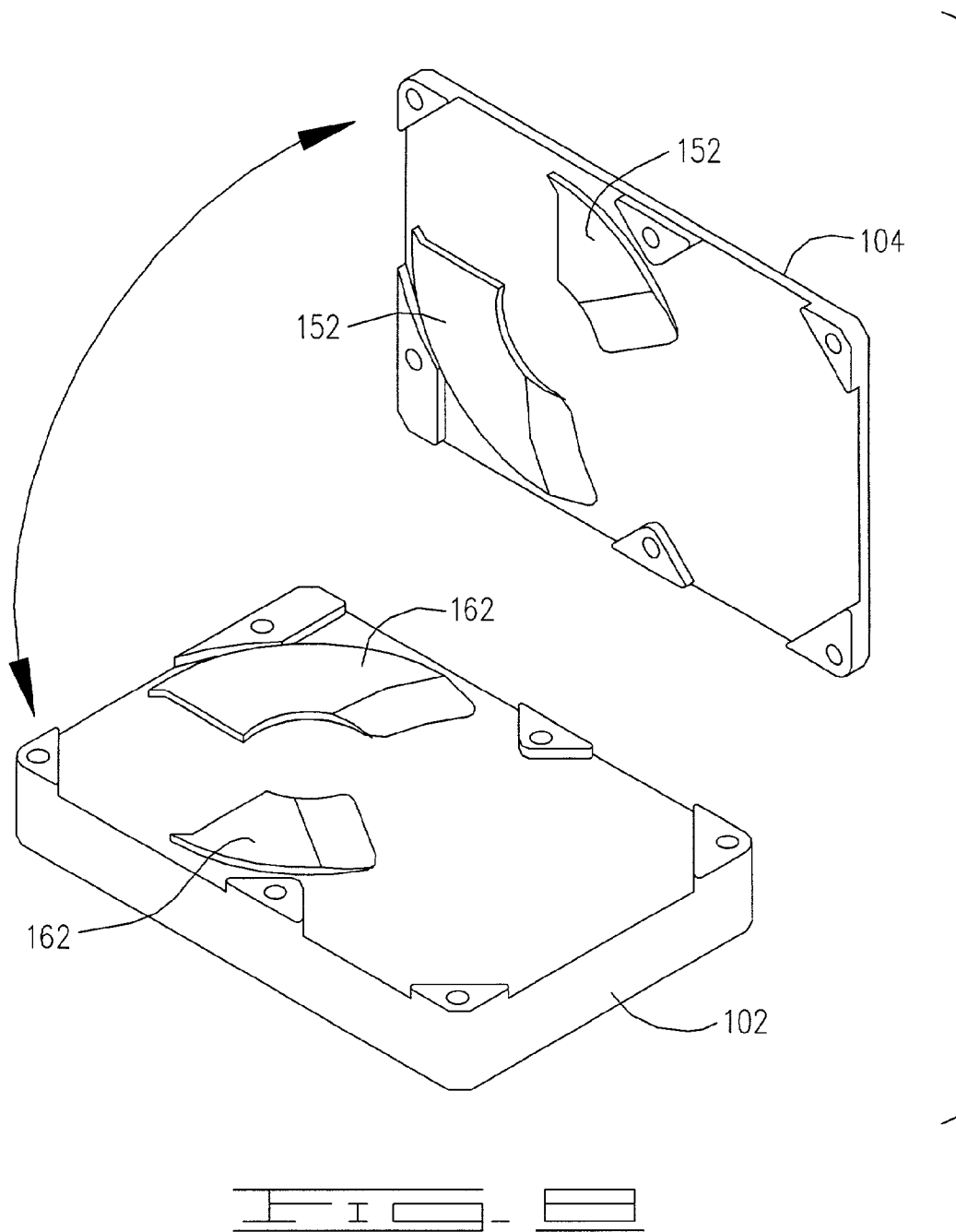
FIG. 8 is an exploded isometric view of the stepped enclosure of the disc drive of FIG. 6.

FIG. 8 is an exploded isometric view of the enclosure 107 illustrating the embodiment of FIG. 6 wherein the airflow conditioning surfaces 152, 162 of the cover 104 and base 102, respectively, cooperate to define the clearance niche 154 and the countering niche 174 (FIG. 6). In this embodiment of the present invention the cover 104 is attachable to the base 102 to form a substantially airtight enclosure, wherein the cover 104 comprises one each of the airflow conditioning surfaces and the base 102 comprises the other airflow conditioning surface.

Returning to FIG. 6, in the embodiment described hereinabove the clearance niche 154 receivingly engages a radial sector of the rotating disc 108, the radial sector comprising a leading edge 190 and a trailing edge 192 with respect to the disc rotation direction 111 (FIG. 1). These edges 190, 192 can define any desired included angular disposition that is at least large enough for the actuator range of movement, such as an included angle of about ninety degrees as shown in FIG. 6.

Similarly, the countering niche 174 receivingly engages a radial sector of the rotating disc 108, the radial sector comprising a leading edge 194 and a trailing edge 196 with respect to the disc rotation direction 111 (FIG. 1). These edges 194, 196 can define any desired included angular disposition, such as an included angle of about ninety degrees as shown in FIG. 6.

The size of the clearance niche is preferably minimized in order to maximize the amount of the disc 108 surrounded by the airflow conditioning surfaces 152, 162. Also, due to the periodicity associated with the rotating disc in relation to the clearance niche, the size of the clearance niche will characterize the rotational harmonics at play. For example, the clearance niche 154 will propagate harmonic vibrations N according to the relationship:

$$N = \frac{2\pi \cdot n}{\alpha} \quad (1)$$

where: n=1, 2, 3, . . .
α=clearance niche included angle

Therefore, for the ninety-degree clearance niche 154 of FIG. 6:

$$N = \frac{360n}{90} \quad (2)$$

so the rotational harmonics with number N*=2, 6, 10, etc. will be amplified but with N**=4, 8, 12, etc. will be suppressed because of opposite pressure action on the leading edge 190 and trailing edge 192. A countering niche 174 with the same ninety-degree construction can be employed to commutatively suppress harmonics. The location of the countering niche 174 can be determined by the relationship:

$$\beta = \frac{2\pi}{N^*} \cdot m \quad (3)$$

where: m=1, 2, 3, . . . etc.

β=angle between niches

Therefore, if the countering niche 174 is placed sixty degrees from the clearance niche 154, as denoted by the reference 199, then the commutative effect of the two niches will suppress harmonics according to:

$$N^{***} = \frac{360}{60} \cdot m \quad (4)$$

for m=1, 2, 3, . . . etc., because of opposite pressure action on the trailing edge 192 at the clearance niche 154 and the leading edge 194 at the countering niche 174. So harmonics with n=6, 12, 18, etc. will be commutatively suppressed. Therefore, the harmonic with number n=6 which will occur with the ninety-degree clearance niche 154 will be commutatively suppressed by the ninety-degree countering niche 174 positioned sixty-degrees apart from the clearance niche 154. The frequency for this sixth harmonic for 10,000 RPM (revolutions per minute) is:

$$\frac{10,000}{60} \cdot 6 = 667 \text{ H}_z \quad (5)$$

Figure 9:
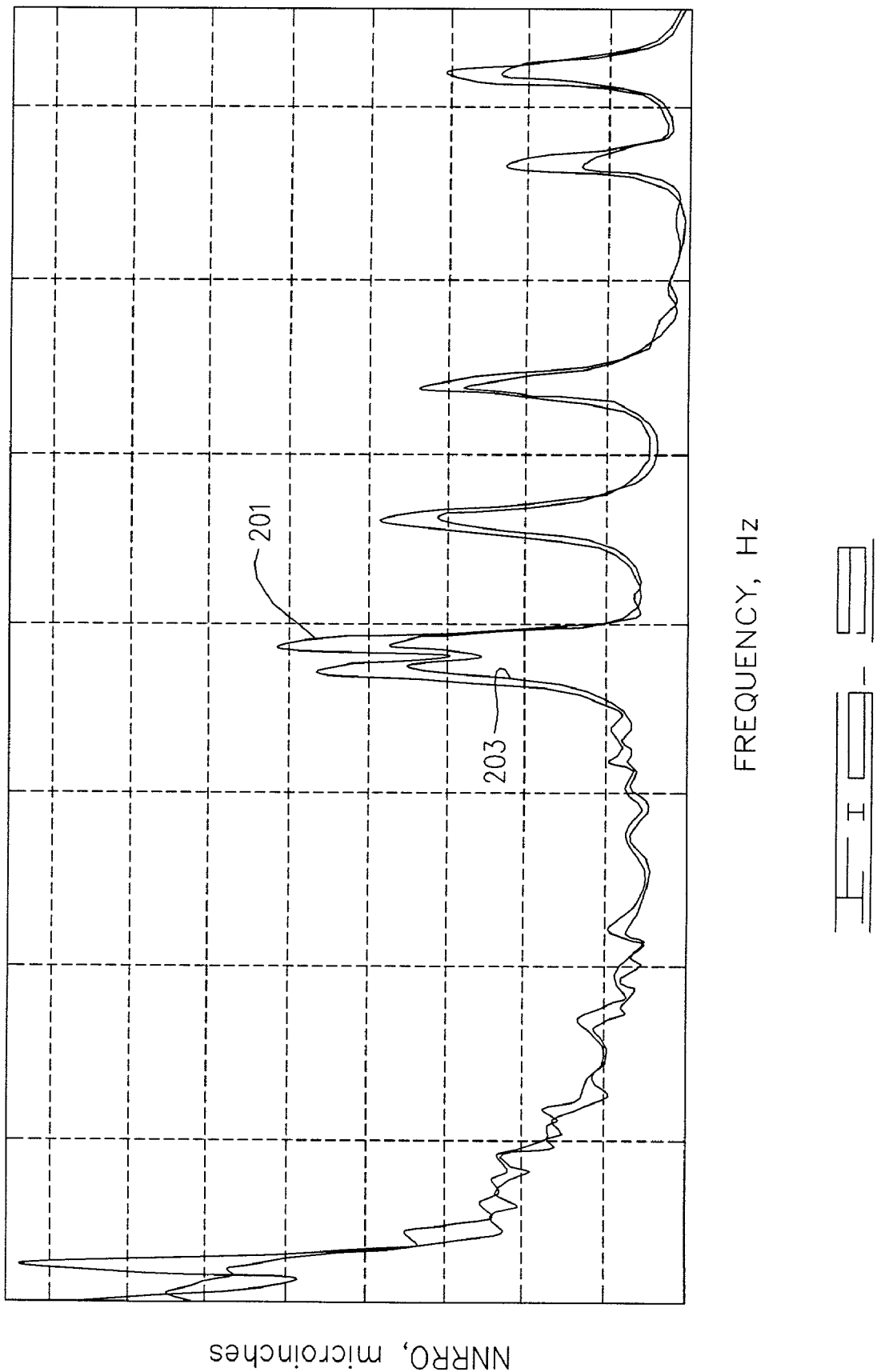
FIG. 9 is a plot of two different frequency response domains for a data storage device, showing the commutative suppression effects of a stepped enclosure in accordance with embodiments of the present invention.

FIG. 9 is a frequency domain of disc vibrations for a 10,000-RPM disc drive which illustrates observed evidence of the commutative suppression effects of employing a countering niche in accordance with the previous example. Curve 201 is the frequency response of the disc 108 of a prior art disc drive enclosure, showing a peak resonant frequency occurs just below 700 Hz. Curve 203 is the frequency response of the disc after replacing the cover 104 with a cover constructed as described above; that is, with 90-degree clearance and countering niches placed at 60-degree separation. It will be noted that significant commutative suppression occurs at the sixth harmonic frequency of about 667 Hz.

Figure 10:
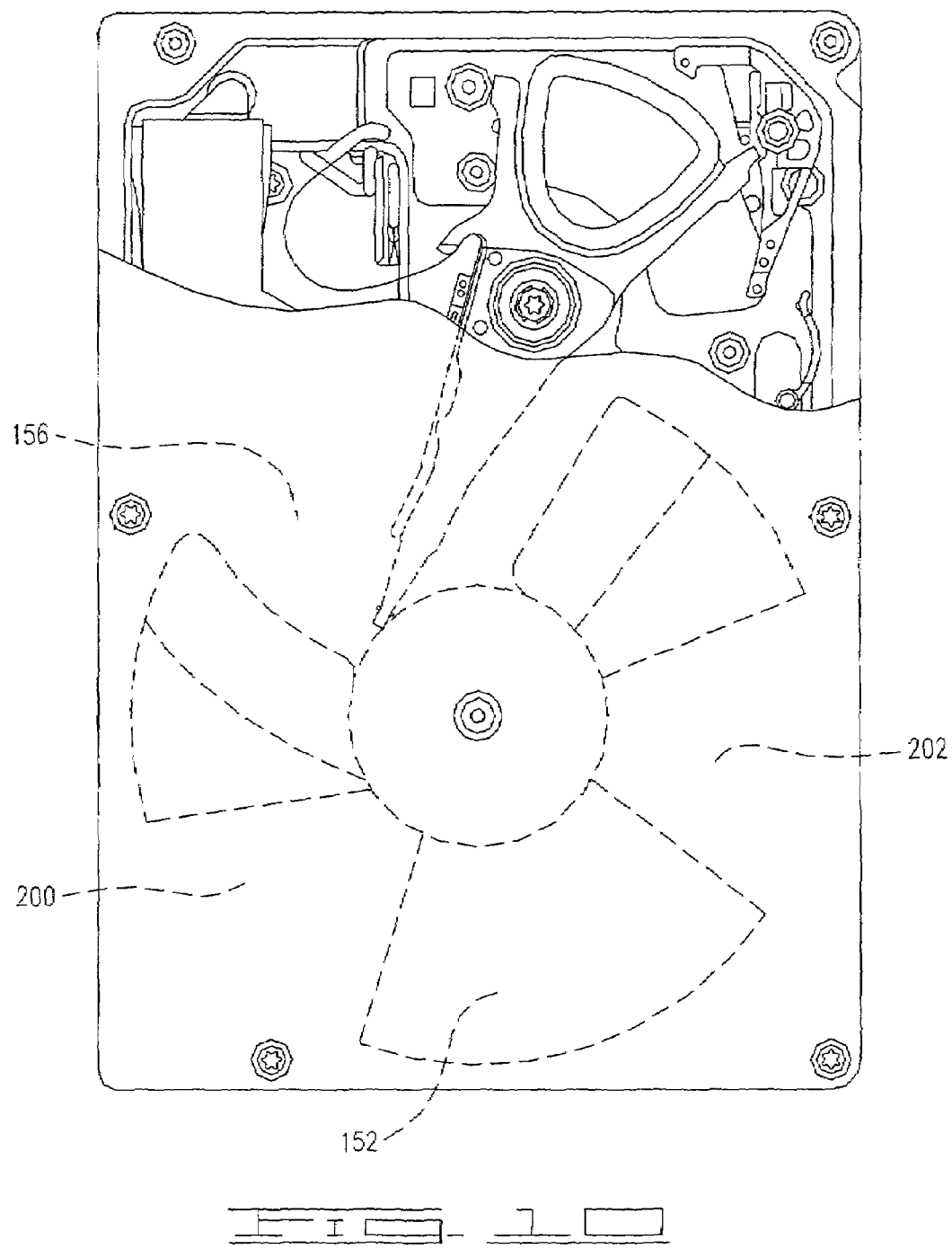
FIG. 10 is a plan view of a data storage device constructed in accordance with an embodiment of the present invention wherein two countering niches are employed.

The countering niche 174 in FIG. 6 is disposed upstream of the clearance niche 154. Alternatively, the countering niche 174 can be disposed downstream of the clearance niche 154. FIG. 10, for example, illustrates an alternative embodiment wherein the airflow conditioning surfaces 152, 162 define a countering niche 200 disposed adjacent the downstream side and another countering niche 202 disposed upstream of the clearance niche 154. In other alternative embodiments not shown more than two countering niches can be employed, and one or more only downstream niche(s) can be employed.

The edges 194, 196 (FIG. 6) of the countering niche 174 are shown comprising generally orthogonal transition surfaces into and out of the countering niche 174. Alternatively, tapered transition surfaces similar to the surfaces 156, 158 (FIG. 2) of the clearance niche can be employed.

Figure 11:
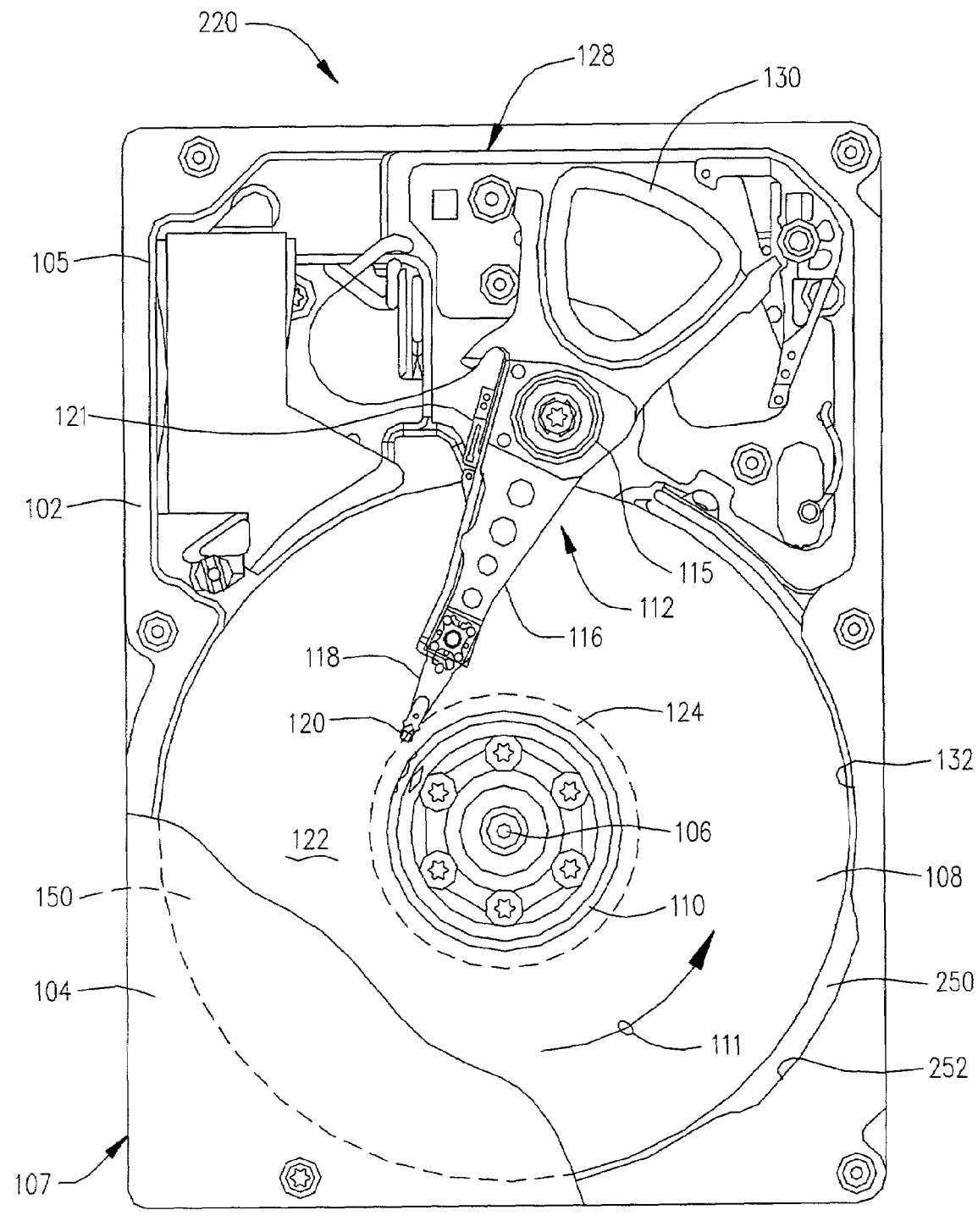
FIG. 11 is a plan view of a data storage device constructed in accordance with an embodiment of the present invention employing a countering niche extending orthogonally to the rotating disc.

FIG. 11 is a view of a data storage device 220 somewhat similar to FIG. 1 with a stepped enclosure constructed in accordance with an alternative embodiment of the present invention. As described hereinabove the upstanding shroud surface 132 defines an airflow conditioning surface disposed a first distance from the edge of the rotating disc 108. The airflow conditioning surface is disposed a first distance in close-fitting relation around a peripheral portion of the rotating disc 108 to decrease the turbidity of the airflow exiting the disc stack 109. An opening 251 in the shroud 132 is necessary for passage of the actuator 112. The opening 251 can be partially back-filled by the downstream shroud 134. A countering niche 250 extending orthogonal to the discs 108 is defined in the airflow conditioning surface 132 by a recessed surface 252 apart from the opening 251 and disposed a second distance from the disc 108, wherein the second distance is greater than the first distance.

The size of the gap between the recessed surface 252 and the disc 108 and the peripheral length of the recessed surface 252 determines the size of the niche 250. Like the laterally extending niches 200, 202 (FIG. 10), the location and size of the niche 252 can be selected based upon the damping characteristics needed to commutatively suppress the excitation effects of the opening 251. One or more orthogonal countering niches 250 can be employed in addition to and/or in combination with the use of one or more laterally extending countering niches 200, 202 (FIG. 9), as the damping requirements demand.

In summary, the embodiments of the present invention provide a stepped enclosure (such as 107) for a data storage device (such as 100) having an actuator (such as 112) operably moveable in a data reading and writing relationship within a range of movement adjacent a disc (such as 108) rotated by a motor (such as 106). The enclosure comprises an airflow conditioning surface disposed in a substantially close-fitting relationship to the disc. The enclosure further comprises a countering niche (such as 174, 250) in the airflow conditioning surface apart from the actuator range of movement commutatively suppressing airflow excitation forces propagating from the enclosure within the actuator range of movement.

In one aspect of the embodiments of the present invention the airflow conditioning surfaces comprise first stationary opposing surfaces (such as 152, 162) of the airflow conditioning surface adjacent a first portion of the disc defining a first gap (such as 168) receivingly engaging the disc. The enclosure further comprises second stationary opposing surfaces (such as 164, 166) adjacent a second portion of the disc defining a clearance gap (such as 170) greater than the first gap receivingly engaging the actuator within the range of movement. The enclosure further comprises third stationary opposing surfaces (such as 178, 180) adjacent a third portion of the disc defining a countering gap (such as 182) greater than the first gap receivingly engaging the disc, the first opposing surfaces separating the second opposing surfaces from the third opposing surfaces.

The clearance gap can comprise a clearance niche (such as 154) in the airflow conditioning surface, comprising a leading edge (such as 156) and a trailing edge (such as 158) and an included angle therebetween receivingly engaging a radial sector of the disc. The countering niche can similarly comprise a leading edge (such as 194) and a trailing edge (such as 196) and an included angle therebetween receivingly engaging a radial sector of the disc. In one embodiment the clearance niche and countering niche comprise substantially equivalent included angles.

In one aspect of the embodiments of the present invention the niches are angularly separated by a selected angle associated with the included angle size and the rotational speed of the disc to commutatively suppress a harmonic frequency substantially matching a resonant frequency of the data storage device.

In alternative embodiments of the present invention the airflow conditioning surface (such as 132) comprises an upstanding shroud member extending along the disc perimeter a first distance from an edge of the disc. The countering niche (such as 250) comprises a recessed surface (such as 252) circumscribing an arc portion of the rotating disc.

In one aspect of the embodiments of the present invention a data storage device is provided, comprising a moving data storage medium, an actuator moveable relative to the medium within a range of movement in a data reading and writing relationship, and a stepped enclosure supporting the medium and the actuator. The stepped enclosure comprises an airflow conditioning surface disposed in a substantially close-fitting relationship to the disc, and a countering niche in the airflow conditioning surface apart from the actuator range of movement commutatively suppressing airflow excitation forces propagating from the enclosure within the actuator range of movement.

In one aspect of the embodiments of the present invention a data storage device is provided, comprising a rotating data storage disc in an operable data reading and writing relationship with an actuator, and means for reducing airflow excitation to the disc by employing a stepped enclosure around the disc and actuator, the enclosure comprising a clearance niche for actuator operable movement and a countering niche apart from the clearance niche for commutatively suppressing airflow excitation forces propagating from the clearance niche.

In one aspect of the embodiments of the present invention a method is provided for reducing airflow excitation forces acting on the actuator in a data storage device, comprising providing an enclosure defining an airflow conditioning surface in a closely-fitting relationship with the data storage surface of the data storage device; defining a clearance niche in the airflow conditioning surface permitting operable movement of the actuator relative to the data storage surface; and defining a countering niche in the airflow conditioning surface apart from the clearance niche commutatively suppressing airflow excitation forces propagating from the clearance niche.

The method can be further defined wherein the providing an enclosure step is further characterized by providing first stationary opposing surfaces adjacent a first radial sector of the data storage surface and spatially disposed at a first distance. The method can be further defined wherein the defining a clearance niche step is further characterized by defining second stationary opposing surfaces adjacent a second radial sector of the data storage surface and spatially disposed at a second distance greater than the first distance. The method can be further defined wherein the defining a countering niche step is further characterized by defining third stationary opposing surfaces adjacent a third radial sector of the data storage surface and spatially disposed at a third distance greater than the first distance, the first surfaces separating the second surfaces from the third surfaces.

The method can be further defined wherein the providing an enclosure step is further characterized by propagating harmonic vibrations N according to the relationship:

$$N = \frac{2\pi \cdot n}{\alpha}$$

where: n=1, 2, 3, . . . etc.
α=clearance niche included angle.

In one embodiment the defining a countering niche step is further characterized by defining a countering niche with a substantially equivalent included angle as the clearance niche.

The method can be further defined wherein the defining a countering niche step is further characterized by defining a countering niche located from the clearance niche at a location determined by the relationship:

$$\beta = \frac{2\pi}{N^*} \cdot m$$

where: m=1, 2, 3, . . . etc.
β=angle between niches.

In alternative embodiments the method is further defined wherein the providing an enclosure step is further characterized by providing an upstanding shroud member extending along the data storage disc perimeter of the data storage device a first distance from the edge of the disc. The defining a countering niche can be further characterized by defining a recessed surface spatially disposed from the disc perimeter a second distance greater than the first distance, circumscribing an arcuate portion of the disc and disposed substantially orthogonal to the data storage surface.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the size and placement of the countering niches may vary, depending on characteristics such as disc size, while maintaining the same functionality without departing from the scope and spirit of the present invention. In addition, although the preferred embodiment described herein is directed to a data storage device, it will be appreciated by those skilled in the art that the teachings of the present invention can be applied to other systems, like data storage test or certification systems, servo track writers, or optical data storage systems, without departing from the scope and spirit of the present invention.

What is claimed is:

1. A stepped enclosure for a data storage device having an actuator operably moveable in a data reading and writing relationship within a range of movement adjacent a disc rotated by a motor, the enclosure comprising:
an airflow conditioning surface comprised of substantially parallel opposing surfaces disposed in a substantially close-fitting relationship to a respective surface of the disc;
a countering niche in the airflow conditioning surface apart from the actuator range of movement commutatively suppressing airflow excitation forces propagating from the enclosure within the actuator range of movement; and a clearance niche associated with the actuator operable range of movement and comprising a leading edge and a trailing edge and an included angle therebetween receivingly engaging a radial sector of the disc.

2. The enclosure of claim 1 further comprising:

first stationary opposing surfaces of the airflow conditioning surface adjacent a first radial portion of the disc defining a first gap receivingly engaging the disc;

second stationary opposing surfaces adjacent a second radial portion of the disc defining a clearance gap greater than the first gap receivingly engaging the actuator within the range of movement; and third stationary opposing surfaces adjacent a third radial portion of the disc defining a countering gap greater than the first gap receivingly engaging the disc, the first opposing surfaces separating the second opposing surfaces from the third opposing surfaces.

3. The enclosure of claim 2 comprising a top cover attachable to a base, the top cover comprising one each of the first, second and third opposing surfaces and the base comprising each of the other first, second and third opposing surfaces.

4. The enclosure of claim 2 wherein a transition surface joining the first and third opposing surfaces is substantially orthogonal to the opposing surfaces.

5. The enclosure of claim 2 further comprising fourth opposing surfaces adjacent a fourth portion of the rotating disc defining a second countering gap greater than the first gap, receivingly engaging the disc, the first opposing surfaces separating the third opposing surfaces from the fourth opposing surfaces.

6. The enclosure of claim 1 wherein the countering niche comprises a leading edge and a trailing edge and an included angle therebetween receivingly engaging a radial sector of the disc.

7. The enclosure of claim 6 wherein the clearance niche and countering niche comprise substantially equivalent included angles.

8. The enclosure of claim 7 wherein the niches are angularly separated by a selected angle associated with the included angle size and the rotational speed of the disc to commutatively suppress a harmonic frequency substantially matching a resonant frequency of the data storage device.

9. The enclosure of claim 1 wherein the clearance niche is disposed downstream of the countering niche.

10. The enclosure of claim 1 wherein the airflow conditioning surface further comprises an upstanding shroud member extending along the disc perimeter a first distance from an edge of the disc.

11. The enclosure of claim 1 wherein the countering niche is characterized as a first countering niche disposed a first distance around a peripheral portion of the disc from to clearance niche, and wherein the enclosure further comprises a second countering niche disposed a second distance around a peripheral portion of the disc from the clearance niche and configured to commutatively suppressing airflow excitation forces propagating from the enclosure within the actuator range of movement.

12. The enclosure of claim 1 wherein the clearance niche and the first and second countering niches are arranged in a substantially equidistant relationship around the disc.

13. A data storage device, comprising:

a moveable data storage medium;

an actuator moveable relative to the medium within a range of movement in a data reading and writing relationship; and a stepped enclosure supporting the medium and the actuator comprising:

an airflow conditioning surface comprised of substantially parallel opposing surfaces disposed in a substantially close-fitting relationship to a respective surface of the medium;

a countering niche in the airflow conditioning surface apart from the actuator range of movement commutatively suppressing airflow excitation forces propagating from the enclosure within the actuator range of movement; and a clearance niche associated with the actuator operable range of movement and comprising a leading edge and a trailing edge and an included angle therebetween receivingly engaging a radial sector of the medium.

14. The enclosure of claim 13 further comprising:

first stationary opposing surfaces of the airflow conditioning surface adjacent a first radial portion of the medium defining a first gap receivingly engaging the medium;

second stationary opposing surfaces adjacent a second radial portion of the medium defining a clearance gap greater than the first gap receivingly engaging the actuator within the range of movement; and third stationary opposing surfaces adjacent a third radial portion of the medium defining a countering gap greater than the first gap receivingly engaging the medium the first opposing surfaces separating the second opposing surfaces from the third opposing surfaces.

15. The enclosure of claim 13 wherein the airflow conditioning surface further comprises an arcuate orthogonal shroud adjacent an edge of the medium and surrounding the countering niche.

16. A data storage device, comprising:

a data storage disc in an operable data reading and writing relationship with an actuator, and first means for commutatively suppressing airflow excitation forces propagating from a clearance niche associated with an operable range of movement of the actuator, the clearance niche comprising a leading edge and a trailing edge and an included angle therebetween receivingly engaging a radial sector of the disc.

17. The data storage device of claim 16 wherein the first means comprises a countering niche receivingly engaging a selected sector of the disc and disposed a first distance around a peripheral portion of the disc from the clearance niche.

18. The data storage device of claim 17 wherein the countering niche is characterized as a first countering niche, and wherein the first means further comprises a second countering niche receivingly engaging a selected sector of the disc and disposed a second distance around a peripheral portion of the disc from the clearance niche.

19. The data storage device of claim 16 further comprising an upstanding shroud surface extending along a peripheral portion of an edge of the disc at a first distance from said edge, and wherein the first means comprises a countering niche formed in said shroud surface comprising a recessed surface extending along a peripheral portion of an edge of the disc at a second distance from said edge greater than said first distance.

20. A method for reducing airflow excitation forces acting on an actuator in a data storage device, comprising:

providing an enclosure defining an airflow conditioning surface comprised of substantially parallel opposing surfaces in a closely-fitting relationship with a data storage surface of the data storage device;

defining a clearance niche in the airflow conditioning surface permitting operable movement of the actuator relative to the data storage surface and comprising a leading edge and a trailing edge and an included angle therebetween receivingly engaging a radial sector of the disc; and defining a countering niche in the airflow conditioning surface apart from the clearance niche commutatively suppressing airflow excitation forces propagating from the clearance niche.

21. The method of claim 20 wherein the providing an enclosure step is further characterized by providing first stationary opposing surfaces parallel to a first radial sector of the data storage surface and spatially disposed at a first distance.

22. The method of claim 21 wherein the defining a clearance niche step is further characterized by defining second stationary opposing surfaces parallel to a second radial sector of the data storage surface and spatially disposed at a second distance greater than the first distance.

23. The method of claim 22 wherein the defining a countering niche step is further characterized by defining third stationary opposing surfaces parallel to a third radial sector of the data storage surface and spatially disposed at a third distance greater than the first distance, the first surfaces separating the second surfaces from the third surfaces.

24. The method of claim 23 wherein the providing an enclosure step is further characterized by propagating harmonic vibrations N according to the relationship:

$$N = \frac{2\pi \cdot n}{\alpha}$$

wherein n=1, 2, 3, ... etc.
$\alpha$=clearance niche included angle.

25. The method of claim 24 wherein the defining a countering niche step is further characterized by defining a countering niche with a substantially equivalent included angle as the clearance niche.

26. The method of claim 25 wherein the defining a countering niche step is further characterized by defining a countering niche located from the clearance niche at a location determined by the relationship:

$$\beta = \frac{2\pi}{N^*} \cdot m$$

where: m=1,2,3, ... etc.
$\beta$=angle between niches.

27. The method of claim 20 wherein the providing an enclosure step is further characterized by providing an upstanding shroud member extending along the data storage disc perimeter of the data storage device a first distance from the edge of the disc.

28. The method of claim 27 wherein the defining a countering niche is further characterized by defining a recessed surface spatially disposed from the disc perimeter a second distance greater than the first distance, circumscribing an arcuate portion of the disc and disposed substantially orthogonal to the data storage surface.

* * * * *

UNITED STATES PATENT AND TRADEMARK OFFICE
CERTIFICATE OF CORRECTION

PATENT NO. : 7,009,808 B2 Page 1 of 1
APPLICATION NO. : 10/147133
DATED : March 7, 2006
INVENTOR(S) : Svetlana I. Kovinskaya and Kenneth L. Pottebaum It is certified that error appears in the above-identified patent and that said Letters Patent is hereby corrected as shown below:

Col. 12, line 39
replace "a data storage"
with --a rotatable data storage--.

Signed and Sealed this

Eighteenth Day of July, 2006

JON W. DUDAS
*Director of the United States Patent and Trademark Office*